United States Patent

[15] 3,662,845

Pratt

[45] May 16, 1972

[54] ELECTRICAL WEIGHING SYSTEM WITH ANALOG-TO-DIGITAL DUAL RAMP CONVERTER

[72] Inventor: Chapin A. Pratt, Rutland, Vt.
[73] Assignee: Howe Richardson Scale Company, Clifton, N.J.
[22] Filed: July 27, 1970
[21] Appl. No.: 58,260

[52] U.S. Cl. .......................... 177/25, 177/210, 177/DIG. 3
[51] Int. Cl. ............................................................ G01g 3/14
[58] Field of Search ............ 177/3, 25, 163, 210, 211, DIG. 3

[56] References Cited

UNITED STATES PATENTS

| | | | |
|---|---|---|---|
| 3,063,635 | 11/1962 | Gordon | 177/163 UX |
| 3,160,811 | 12/1964 | Muniz et al. | 177/210 X |
| 3,192,535 | 6/1965 | Watson | 177/211 X |
| 3,446,299 | 5/1969 | Leonowicz | 177/211 X |

Primary Examiner—Stephen J. Tomsky
Assistant Examiner—George H. Miller, Jr.
Attorney—Norris & Bateman

[57] ABSTRACT

An electrical system having an analog-to-digital dual ramp converter wherein an analog input signal to be converted into recurrent digital form is applied to the input of the converter's integrator circuit for a first, predetermined time interval and a known, predetermined analog reference signal is applied to the input of the integrator in response to a predetermined control signal for a second time interval that is proportional to the magnitude of the analog input signal. A series of sequentially occurring pulses of fixed time separation are produced by a pulse generator and are transmitted by a gate to a pulse counter. The gate, which is under the control of the integrator output, will be open for the two time intervals during which the integrator output deviates from a predetermined level in a predetermined direction. At the beginning of the first time interval the counter is reset to a predetermined starting count, and it will be driven by the gated generator-produced pulses to a predetermined intermediate scale count which is less than the full scale count. At this time, the previously mentioned control signal is supplied from the counter for applying the reference signal to the integrator. The control signal is also gated by a logic circuit to reset the counter. The logic circuit is conditioned by the reset signal and the occurrence of the control signal at the end of the first time interval to inhibit any reoccurrence of the control signal during the second time interval in which the counter is being driven by the generator-produced pulses to supply a digital output representing the magnitude of the analog input signal.

4 Claims, 3 Drawing Figures

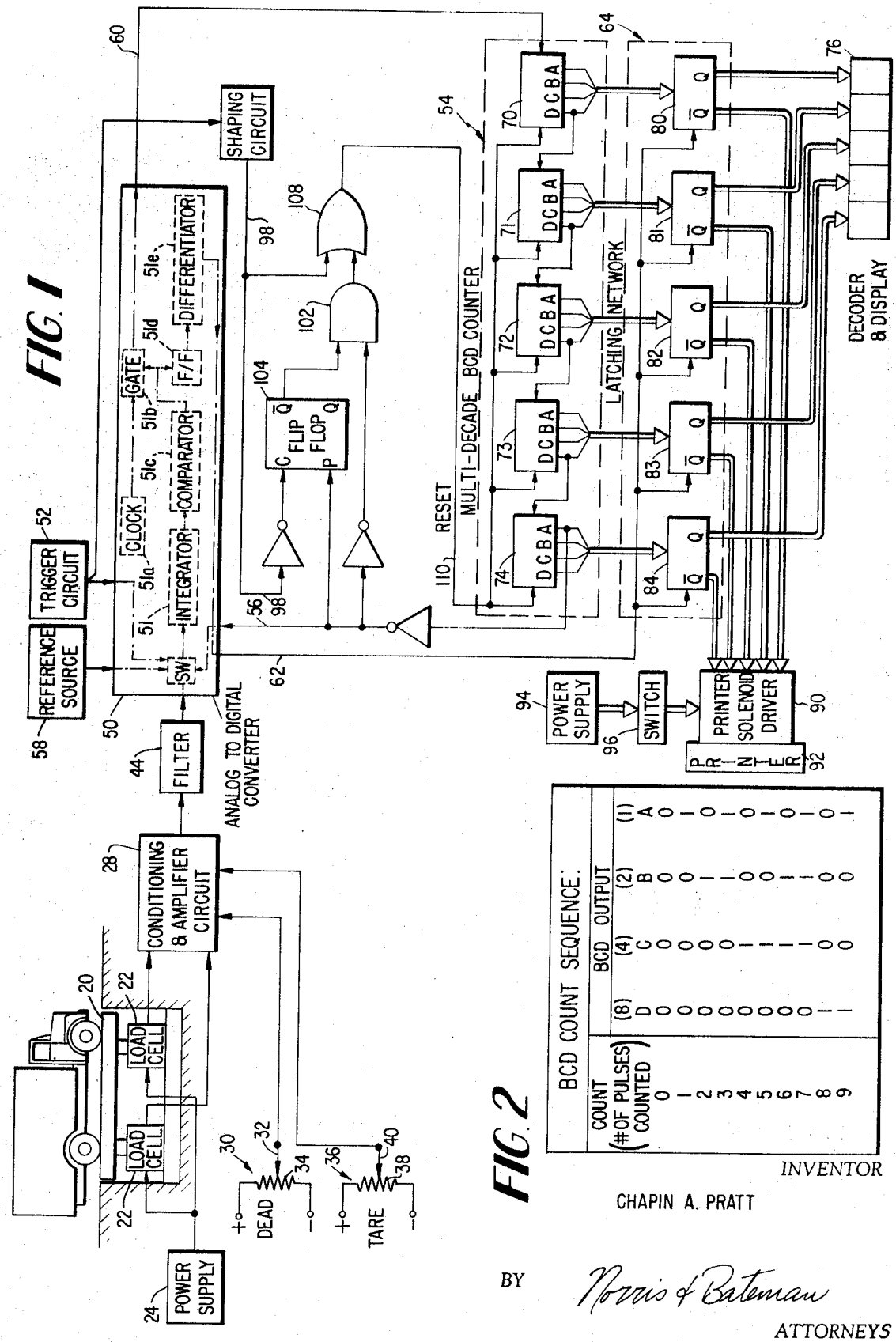

ELECTRICAL WEIGHING SYSTEM WITH ANALOG-TO-DIGITAL DUAL RAMP CONVERTER

FIELD OF INVENTION

This invention relates to electrical systems wherein the magnitude of an analog signal is translated into recurrent digitized form. More particularly, the present invention is concerned with systems that provide a digital representation of a measured variable such as the weight of a load.

BACKGROUND

Prior to this invention various types of dual ramp analog-to-digital converters have been proposed for translating the amplitude (current or voltage) of an electrical analog signal into recurrent digitized form. In a dual ramp type converter, the analog-to-digital conversion of an analog signal voltage is typically effectuated by integrating the analog signal for a fixed predetermined time period ($T_1$) and then integrating an opposite polarity reference signal potential for a second time period ($T_2$) which will vary in accordance with the time integral of the analog signal at the end of the fixed time period ($T_1$).

Assuming that the level of the analog signal voltage is constant, the time integral of the analog signal will be a constant slope ramp voltage which starts at a predetermined level such as zero volts at the beginning of time period $T_1$. The level at which the first ramp voltage terminates will be dependent upon the level of the analog signal voltage. The time integral of the reference potential will also be a constant slope ramp voltage starting at the level at which the first mentioned ramp voltage terminated and sloping in the opposite direction. The variable time period ($T_2$) is the time interval starting from the beginning of the second-mentioned ramp voltage and terminating at the point where the second-mentioned ramp voltage reaches the level from which the first mentioned ramp voltage started. The variable time period $T_2$ will thus be proportional to the level of the analog signal voltage.

During the above-mentioned time period $T_2$ a series of pulses of equal time separation is gated to a pulse counter. The pulses may be supplied by a clock or time base oscillator. Since the number of pulses supplied to the counter during the time period $T_2$ will be proportional to the level of the analog signal voltage, the digital output of the counter at the end of time period $T_2$ will be a measure of the analog signal level.

To fix the fixed time period $T_1$, some prior dual ramp converters utilize the above mentioned pulse counter as a frequency divider. In this type of dual ramp converter, the clock pulses are gated to the pulse counter during both the fixed and variable time periods $T_1$ and $T_2$. In measuring the fixed time period $T_1$, the pulse counter is driven to full scale, and at the full scale count the pulse counter supplies a reset signal condition which is utilized to terminate the integration of the analog signal voltage and to start the integration of the reference potential. One purpose of driving the pulse counter to full scale during the fixed time period $T_1$ is to enable the pulse counter to start counting from zero when the clock pulses are gated to the counter during the variable time period $T_2$. In this manner, the digital output of the pulse counter at the end of the variable time period $T_2$ will be proportional to the numerical equivalent of the level of the analog signal voltage and, consequently, to any measured condition that the analog signal voltage may represent. One of the significant disadvantages of this type of dual ramp converter is that the overall time (the sum of time periods $T_1$ and $T_2$) for the dual ramp integrating cycle is relatively long. This is due to the fact that the pulse counter must be driven to full scale in the fixed time period to enable it to start with a zero count at the beginning of the variable time period.

Another type of dual ramp converter enables the pulse counter to be driven from a starting count of zero at the beginning of the variable time period $T_2$ by gating clock pulses to the counter only during the variable time period $T_2$. To provide a measure of the fixed time period this type of dual ramp converter utilizes a separate frequency divider which is connected to the output circuit of the clock and which is responsive to the count-in of a predetermined number of clock pulses to (a) start the integration of the reference potential and (b) to open a gate for transmitting clock pulses to the pulse counter. This type of dual ramp converter is objectionable from the standpoint that it requires two separate pulse counters: one to count the pulses during the variable time period $T_2$, and the other which is utilized as a frequency divider to divide the clock pulse train to furnish a signal for starting the integration of the reference potential. Furthermore, the dual ramp integrating cycle is relatively long, for the time period that is fixed and determined by the frequency divider in this type of dual ramp converter will be the sum of the time intervals for generating the two previously mentioned ramp signals.

SUMMARY AND OBJECTS OF INVENTION

This invention, according to one of its major objects, avoids the foregoing shortcomings of prior dual ramp converters, but yet employs a starting count to zero in the pulse counter at the beginning of the previously mentioned variable time period $T_2$. Thus, the system of this invention is capable of providing a faster dual ramp integrating cycle and, consequently, a faster frequency of the re-occurring digitized signal condition in a system where it is desirable to employ a starting count of zero in the pulse counter.

In view of the foregoing advantages, this invention is particularly applicable to systems in which the analog signal represents a measured variable condition (such as force, temperature, etc.) and in which it is desired to provide a counter output that is proportional or equal numerically to the measured variable condition.

In weighing systems, for example, a transducer or load cell circuit, which is operatively connected to a load-receiving structure (such as, for example, a weighing platform), produces a D.C. signal voltage which is proportional to the weight of the load applied to the load receiving structure. In converting this weight-representing D.C. signal voltage into recurrent digitized form, it is important that the digital output of the counter be numerically equal to the weight of the load being weighed to provide an intelligent digital read out in terms of the weight of the applied load.

The foregoing objects are achieved by utilizing a suitable dual ramp analog-to-digital converter of conventional form in conjunction with a pulse counter and a novel logic circuit which supplies counter reset signals at appropriate times during the dual ramp integrating cycle. The dual ramp converter is preferably of the type which contains an integrator and a suitable switching network for sequentially applying a sample of the weight-representing D.C. signal voltage and an opposite polarity reference potential to the input of the integrator. When the sample of the weight-representing D.C. signal is applied to the integrator, the integrator will generate a first ramp signal voltage starting from a suitable threshold such as zero volts. The slope of the first ramp will be proportional to the magnitude of the sampled D.C. signal.

In response to the generation of the first ramp voltage, a gate or switch between a suitable pulse generating source and the pulse counter is activated to transmit a series of pulses of equal time separation to the counter to drive the counter from a reset, starting count of zero to a predetermined value which is significantly less than the counter's full scale count and, particularly which is significantly less than the maximum count (such as 20,000 pulses) to which the counter can be driven during the variable time interval $T_2$. For example, the full scale count may be 20,000 pulses, and connections may be provided at half scale to extract a reset signal from the counter in response to the count-in of 10,000 pulses.

This reset signal has two functions. First, it is applied to the dual ramp converter to switch the integrator of the converter from the analog signal source to the reference potential source. Second, it is supplied to the previously mentioned logic circuit which is conditioned to gate it to the pulse counter to reset the counter to zero. Since the time for counting in the predetermined number of pulses (10,000 pulses in this example) during generation of the first ramp voltage is fixed, then the time period ($T_1$) for generating the first ramp voltage will also be fixed.

In response to applying the opposite polarity reference potential (i.e., opposite with respect to the weight-representing D.C. signal voltage) to the input circuit of the converter's integrator, the integrator will generate a second ramp voltage starting at the level at which the first ramp voltage is terminated and sloping in a direction that is opposite to the slope of the first ramp voltage. The generation of the second ramp will continue until it reaches the threshold from which the first ramp started.

During the generation of the second ramp voltage, the gate or switch between the pulse generating source and the counter will still be activated to gate the pulses to the pulse counter, and the number of pulses in the pulse train that is supplied during the generation of the second ramp or time period $T_2$ will be proportional to the level of the D.C. signal voltage.

Consider, for example, a 20,000 pound weighing system which will produce a D.C. signal of 10 volts for a capacity load of 20,000 pounds. If the dual ramp converter is capable of producing 20,000 pulses during the variable time period $T_2$ in response to the 10 volt analog signal, then each pulse will be numerically equivalent to one pound. Assume now, that the weight of the applied load is 11,000 pounds. The dual ramp converter will therefore supply 11,000 pulses to the pulse counter during the variable time period $T_2$ in which the second ramp is being generated.

Since the pulse counter has been reset to zero at the beginning of the variable time period $T_2$, the starting count in the counter will be zero for the count-in of the 11,000 pulses in the weight-representing pulse train. At the end of the variable time period $T_2$, the digital output of the counter will therefore register a count that is numerically equal to the weight of the 11,000 pound load. When the count-in of the 11,000 pulses in the weight-representing pulse train reaches 10,000, the previously mentioned reset signal will again be transmitted by the counter to the logic circuit and to the dual ramp converter. The logic circuit, however, is conditioned by the first transmission of the reset signal, which signalled the termination of the first ramp signal, to block or reject the second transmission during the count-in of the weight-representing pulse train. Therefore, the pulse counter will not reset to zero and, instead, will continue to count in the pulses in the weight-representing pulse train. In addition, the dual ramp converter is conventionally equipped to reject the above-mentioned second transmission of the reset signal if one occurs during the count-in of the weight-representing pulse train.

A dual ramp converter of the type mentioned above may conventionally be equipped to sample the weight-representing D.C. signal voltage in response to a recurrent trigger signal. The trigger signal may be a sawtooth potential, and the converter's integrator will integrate the sampled D.C. signal voltage. In addition, the trigger signal may be supplied to the logic circuit for conditioning the logic circuit to supply a reset signal to the pulse counter at the beginning of the generation of the first ramp signal in the fixed time period $T_1$. Thus the pulse counter will be reset to a count of zero for starting the count-in of the fixed time period pulses in the next dual ramp integration cycle.

Although the following embodiment describes the application of this invention in a weighing system, it will be appreciated that this invention has many other applications.

Further objects of this invention will appear as the description proceeds in connection with the appended claims and the below-described drawings.

DESCRIPTION OF DRAWINGS

FIG. 1 is a partially functional, schematic diagram of a weighing system embodying the principles of this invention;

FIG. 2 is a BCD truth table showing the logic states for the pulse counter illustrated in FIG. 1.

DETAILED DESCRIPTION

Figure 3:
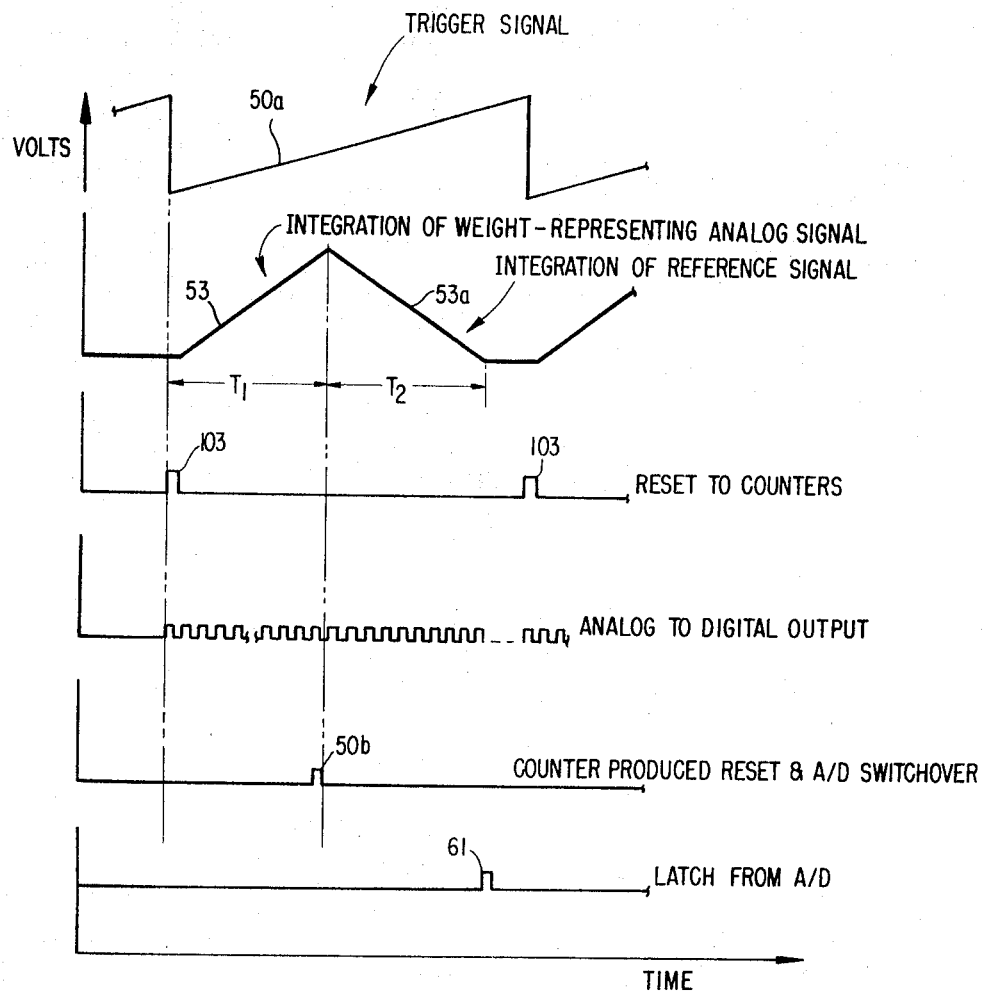
FIG. 3 is a time plot of the input and output signal conditions for the dual ramp, analog-to-digital converter shown in FIG. 1.

The embodiment shown in FIG. 1 and incorporating the principles of this invention comprises a platform weighing system having a weighing platform 20 and an assembly of load cells (two shown) 22 supporting platform 20. Load cells 22 are conventionally arranged one at each of the four corners of platform 20, and platform 20 is arranged to receive a vehicle, such as a truck, or a container. Each of the load cells 22 may be of the conventional silicon or resistance strain gauge type and is excited by a suitable D.C. power supply source indicated at 34.

It will be appreciated that the algebraic summation of the load cell output signal voltages may be summed up in suitable conventional conditioning and amplifying circuit indicated at 28.

Since the summed output signal voltage developed by the load cell assembly in this embodiment will be proportional to the weight of platform 20 as well as the weight of the load placed on platform 20, a dead weight tare adjustment is provided for by a potentiometer 30 having a moveable wiper or arm 32 which is adjustable along a resistor 34. Resistor 34 is connected across a suitable source of D.C. power, as shown. The voltage impressed on wiper 32 is conventionally applied to a suitable summing junction in circuit 28 along with the load cell assembly output signal voltage. The load cell assembly output signal voltage and the dead weight potentiometer signal voltage will be opposite in sign. Wiper 32 is adjusted to offset or tare out the weight of scale parts acting on the load cell assembly to thereby provide a zero signal voltage condition at the output of circuit 28 when no load is on the platform 20. Thus, the signal voltage at the output of circuit 28 will be closely proportional to the load placed on platform 20.

An additional potentiometer 36 is advantageously provided for taring out the weight of a truck or container so as to afford a read out of the weight of a load in the truck or container. Potentiometer 36 comprises a resistor 38 connected across a suitable source of D.C. power supply and a moveable wiper or arm 40 adjustable along resistor 38. The voltage on wiper 40 is advantageously applied to the summing junction that the dead weight potentiometer signal voltage is applied to in circuit 28, and the polarity of the signal voltage is applied to in circuit 28, and the polarity of the signal voltage developed on wiper 40 will also be opposite to that of the load cell assembly output signal voltage. Thus, the load cell assembly output signal voltage may selectively be reduced by a magnitude corresponding to the weight of the truck or container on platform 20 by adjusting potentiometer 36.

If it is desired to read out the gross weight (i.e., the weight of the truck or container and the load therein), potentiometer 36 is set to provide a zero voltage condition on wiper 40. Thus, the level of the analog D.C. signal voltage at the output of circuit 28 will be proportional to the gross weight. If it is desired to read out the net weight (i.e., only the weight of the load delivered to the truck or container on platform 20), potentiometer 36 is selectively adjusted in the previously described manner. The level of the analog D.C. signal voltage at the output of circuit 28 will therefore be proportional to the weight of the load in the truck or container on platform 20. The gain of circuit 28 is conventionally adjustable.

With continued reference to FIG. 1, the D.C. weight-representing, amplified output signal voltage of amplifier circuit 28 is applied to a filter 44 which filters out any A.C. component that may be superimposed on the D.C. signal. Desirably, filter 44 is of the low pass type having good frequency and time response characteristics to develop a filter output signal which is substnatially free of A.C. components that might interfere with the trouble free operation of the system.

The amplified and conditioned, load cell-developed signal voltage at the output of filter 44 is applied to the input of a dual ramp analog-to-digital converter 50. Converter 50 is of suitable, conventional form for producing a digital representation that is related to the level of the weight-representing analog signal voltage applied to the input of the converter. In this embodiment, the digital representation is in the form of a fixed frequency pulse stream or train having equal time separations between pulses.

One conventional form of converter 50 is the AN2300 series dual ramp converter manufactured by the Analogic Corporation. This type of converter has an integrator 51, and the analog signal voltage applied to the input of the converter is integrated by integrator 51 over a fixed, predetermined time period $T_1$ (see FIG. 3) in response to a triggering signal 50a (FIG. 3) from a sample rate trigger circuit 52. The resulting ramp voltage (indicated at 53 in FIG. 3) that is generated is initiated from a predetermined voltage level such as zero volts. The slope of the ramp will be proportional to the level of the analog signal voltage at the moment it was sampled. During the generation of this fixed time base ramp voltage, a train of fixed frequency pulses from a clock 51a in converter 50 are serially routed through a gate 51b to a multi-decade BCD (Binary Coded Decimal) counter circuit generally indicated at 54 in FIG. 1. Gate 51b is controlled in a suitable manner by a signal derived from the output of integrator 51. In this embodiment a comparator 51c compares the integrated output of integrator 51 with a zero voltage level to supply an enabling signal to gate 51b for maintaining gate 51b open as long as the integrated output deviates from zero in a predetermined direction. When the integrated output goes to zero, gate 51b will close. For the signal conditions shown in FIG. 3, gate 51b will be open only when the integrated output is positive.

The range of converter 50 may be, by way of example, zero to 20,000 pulses, and the pulse count loaded into counter circuit 54 during the fixed time base integration may be 10,000 pulses which is significantly less than the full scale count of counter circuit 54. This pulse count (10,000 pulses) fixes the time interval ($T_1$) of the first integration, and when the last of 10,000 pulses is loaded into counter circuit 54, counter circuit 54 supplies a reset signal 50b (FIG. 3) over a line 56 to converter 50.

This reset signal switches converter 50 from the output of filter 44 to a suitable source of reference voltage as indicated at 58 in FIG. 1. Converter 50 will now integrate the analog reference signal. This reset signal is also operative through a logic circuit 57 to reset counter circuit 54 to zero.

The p53op-posite to that of the analog signal supplied by filter 44. The time integral of the reference signal will slope in a direction that is opposite as compared with that of the time integral of the filter output signal. Thus, a second ramp 53a (FIG. 3) is generated starting from a voltage at which the first ramp 53 was terminated, and this second ramp 53a will be started in response to the reset signal 50b from counter circuit 54. The slope of this second ramp 53a is constant and proportional to the fixed reference voltage level, and during the time interval that the reference signal is being integrated, the converter clock pulses are routed by line 60 to counter circuit 54.

When the second ramp 53a reaches the voltage level from which the first ramp was initiated, gate 51b closes, and the signal condition at the output of comparator 51c switches a flip flop circuit 51d to cause a differentiator circuit 51e to supply a latching signal 61 (FIG. 3) over line 62 to a latching network 64. Latching network 64, as will be described in greater detail later on, is connected to the output of counter circuit 54, and when the latching signal 61 is received from converter 50 it latches in and thereby memorizes the BCD output of counter circuit 54. It will be appreciated that the time interval $T_2$ (FIG. 3) of the second ramp and thus the number of converter pulses loaded into counter circuit 54 during this second time interval will be substantially proportional to the level of the analog signal supplied by filter 44 at the time that it was sampled. Circuits 51d and 51e conventionally form a part of converter 50.

Trigger circuit 52 may be of any suitable appropriate form, and it may be incorporated as part of converter 50. One form of trigger circuit provides a sawtooth like signal voltage by cyclically charging and discharging a capacitor. The repetition rate of the sawtooth signal voltage will determine the rate at which the weight-representing analog signal voltage is sampled.

Counter circuit 64 may be of any appropriate conventional form and is shown to comprise a series of conventional BCD electronic decade counters 70, 71, 72, 73 and 74 each having a four-bit, 1-2-4-8 BCD output and respectively representing the units, tens, hundreds, thousands and tens of thousands digits in a weight-indicating, multi-digit decimal number to be displayed by a visual, digital translator and display device 76. Counters 70-74 advantageously are the monolithic type SN7490 having a divide-by-two stage and a divide-by-five stage.

The truth table or BCD count sequence for each of the counters 70-74 is shown in FIG. 2. Each counter will automatically reset when the signal level at its D pin changes from a high (a logical 1) to a low (a logical 0) at the tenth place. With the illustrated connections, each of the counters 70-73 will transfer the count of 1 to the next succeeding counter for every 10 counts coming into the counter. It will be appreciated that the number of counters employed in circuit 54 will depend upon the number of decades that are desired in the number to be displayed.

Still referring to FIG. 1, latch network 64 comprises a series of BCD data word storage or memory latches 80, 81, 82, 83 and 84, one for each of the counters 70-74. Latches 80-84 advantageously are of the four-bit quad type SN7475, each having four storage devices for storing a four-bit data word and the complement thereof. For this purpose each of the four storage devices in each latch has a Q and $\overline{Q}$ output as indicated. Each storage device also has a data bit input pin and a memory or latch pin. The data words to be stored in latches 80-84 are supplied by counters 70-74 respectively.

For the foregoing type of latch, the latching signal line 62 is connected to the latch pin of each storage device in latches 80-84. When converter 50 supplies the proper logical state on line 62, whatever binary states that are present on the data input pins of latches 80-84 will be stored on the $\overline{Q}$ output pins of the latches, and the complements will be stored on the Q output pins.

As shown, the outputs of counters 70-74 are connected in parallel to latches 80-84. The information in counters 70-74 is therefore transferred in parallel to latches 80-84 respectively. Latches 80-84 memorize this information when the proper latching logical state is supplied by converter 50 as previously described.

The Q output pins of each of the latches 80-84 are connected in parallel to one module in device 76. In this embodiment device 76 will have five modules, one for each of the latches 80-84. Device 76 may be of any suitable, conventional form for accepting a BCD input at a relatively low voltage level and for generating at each module the corresponding decimal output 0 through 9. One type of device 76 is Sigma 7, Model 32, manufactured by Sigma Instruments, Inc. of Boston, Massachusetts. In converting back to decimal form, the truth table in FIG. 2 may be utilized to determine the number that device 76 will display in response to the data information latched on the output pins of latches 80-84.

The BCD data information latched in or memorized by latches 80-84 may also be applied to a printer solenoid and solenoid driver circuit 90 of appropriate, conventional form. Energization of printer solenoids in circuit 90 actuates type in a conventional printer 92 in a known manner. Through suitable logic in circuit 90, the BCD data information applied to circuit 90 selects the printer solenoids to be energized when power is applied through a switch circuit 96 from a suitable power supply source 94.

From the foregoing it is clear that when a load is placed on platform 20, the load cell assembly will produce a D.C. analog signal voltage that is conditioned and amplified by circuit 28.

The level of the D.C. analog signal voltage at the output of circuit 28 will be proportional to the gross weight or net weight of the load depending upon the selected setting of potentiometer 36 as previously described. This weight-representing analog signal voltage is applied through filter 44 to the input of converter 50.

In response to each successive trigger signal supplied by circuit 52, converter 50 samples the analog signal voltage at its input, and upon sampling the analog signal, converter 50 first integrates the sampled analog signal and then integrates the reference signal from source 58. During integration of the weight-representing analog signal voltage from filter 44, the pulses produced by converter 50 are counted by counter circuit 54, and when the pulse count reaches 10,000, a logical 1 will be provided on the A pin of counter 74. This logical state will be inverted and transferred by line 56 to cause the integrator in converter 50 to switch from filter 44 to source 58 at the proper time. It will be appreciated that counter 70–74, in counting the number of pulses in each pulse train that is supplied by converter 50, produces the equivalent 8-4-2-1 BCD data information at their output pins.

As shown in FIG. 1, the signal on line 56 is inverted again and applied to an And gate 102 in circuit 57. The other input of gate 102 is connected to the complementing output pin $\bar{Q}$ of a dual D flip flop 104 which, in this embodiment, is the type SN7474. The signal condition on line 56 is applied without further inversion to the pre-set input pin of flip flop 104, as shown. After each conversion and in response to the next trigger signal, converter 50 supplies the counter reset signal 103 (FIG. 3) to line 98. It will be appreciated that the trigger signal 50a may be applied to a suitable shaping circuit to produce the reset signal 103 at the trailing edge of each trigger signal. The reset signal 103 on line 98 is applied to one input of an OR gate 108. In addition it is inverted and applied to the clear pin of flip flop 104 as shown. The output of And gate 102 is connected to the other input of OR gate 108, and the output of OR gate 108 is connected by a line 110 to the reset pins of counters 70–74.

After each analog-to-digital conversion and in response to the trigger signal supplied by circuit 52 a logical 1 is supplied on line 98, and this signal condition is or'ed through gate 108 to reset counters 70–74 to zero in preparation for the next conversion. In addition, a logical 0 will be applied to the clear pin of flip flop 104. This signal condition together with a logical 0 at the pre-set pin of flip flop 104 will change the state at the $\bar{Q}$ output pin of the flip flop to a logical 1. At this point, however, no information will be And'ed through gate 102 since the logical state on line 56 is inverted before it is applied to gate 102. At this time, therefore, the signal conditions at the input to gate 102 will be a 0 and a 1.

As previously mentioned, converter 50, in response to the trigger signal from circuit 52 integrates the filter output voltage, and during this time, the converter's clock pulses are gated through to counter circuit 54. In this embodiment counter circuit 54 will be counting every pulse, and when the 10,000th pulse is counted in, a logical 1 is applied to the A pin of counter 74 and inverted, and the inversion is applied to line 56. Now the signal condition at the input to gate 102 will change to supply a logical 1 through gate 108 to reset the counters to zero. In addition the logical state supplied by line 56 will cause converter 50 to switch over to the reference source 58, and converter 50 contains the logic to block or reject further switch over signal conditions until the next conversion. (Alternately, the output of And gate 102 may be connected to converter 50 to supply a switch-over signal to converter 50 in place of line 56.) Also, a logical 1 and a logical 0 will respectively be applied to the clear and pre-set pins of flip flop 104, causing the state on the $\bar{Q}$ pin to change to a logical 0. This condition will prevent resetting of the counters in the event that the number of converter produced pulses supplied during generation of the second ramp equals or exceeds 10,000. That is, a logical 1 at the A pin of counter 164 will not reset the counters during the count-in of the weight-representing pulse train.

As the reference signal from source 58 is integrated converter 50 will supply the weight-representing pulse train to counter circuit 54, and the number of pulses in this train will be proportional to the level of the sampled analog signal supplied by filter 44. At the completion of the integration of the reference signal from source 58 ( i.e., when the second ramp reaches the level from which the first ramp was initiated), the supply of further pulses from converter 50 is blocked by the closing of gate 51b, and counter circuit 54 will now have counted in the number of pulses in this weight-representing pulse train. At this time, converter 50 is responsive to supply a latch signal over line 62 to latches 80–84. In response to this latch signal, latches 80–84 transfer the BCD data words supplied by counters 70–74 to their output pins Q and to latch in or memorize the transferred BCD data words at their Q output pins. The transferred BCD data information will be latched in uncomplemented form at the Q output pins, and the complements of the transferred BCD data words will be latched in on the $\bar{Q}$ pins of the latches. Upon latching in this new information, the old information on the Q and $\bar{Q}$ pins of latches 70–74 is removed.

The memorized, weight-representing BCD data information at the Q output pins of latches 80–84 is applied to device 76 which decodes the information to display the weight in decimal form. In addition, the weight-representing BCD data information latched in at the Q output pins of latches 80–84, is applied to circuit 90 to select those printer solenoids that will be energized when switch circuit 96 is actuated to apply the power supply voltage from source 94 to circuit 90.

In response to the next trigger signal supplied by circuit 52, converter 50 again samples the weight-representing analog signal voltage at its input, and a reset pulse 103 is supplied over line 98. This reset pulse is or'ed through gate 108 to reset counters 70–74 to zero in preparation for counting the next pulse train.

Counter circuit 54 and latch network 64 may be the same as that described in the U.S. copending application Ser. No. 58,259, bearing the attorney docket No. W-420, filed on even data herewith, assigned to the assignee of the instant application and entitled "Electrical Weighing Systems."

From the foregoing description it will be appreciated that by resetting counter circuit 54 to zero at the beginning of time period $T_2$, the digital output of circuit 54, at the end of time period $T_2$, will be numerically equivalent to the number of pulses that are transmitted by converter 50 during the time period $T_2$. If, for example, converter 50 is responsive to a 10 volt, weight-representing D.C. signal to transmit 20,000 pulses during time period $T_2$ and if the illustrated weighing apparatus is equipped to supply a 10 volt D.C. signal at the output of filter 44 in response to a 20,000 pound load on platform 20, then it is clear that at the end of time period $T_2$, the output of counter circuit 54 will be numerically equal, in terms of the illustrated BCD number system, to the weight of the applied load. Thus, the BCD output of counter circuit 54 may be converted into and read out in terms of its equivalent decimal number, and this decimal number will be numerically equal to the weight of the applied load.

I claim:
1. In a weighing apparatus, a structure for receiving a load to be weighed, electrical signal producing means responsive to the weight of a load applied to said structure for producing a D.C. signal having a magnitude that is a function of the weight of the load applied to said structure, an analog-to-digital converter operatively connected to said signal producing means for recurrently converting said D.C. signal into digital form, a pulse counter having its input connected to the output of said converter, signal utilization means operatively connected to the output of said counter, said converter being operative in each conversion of said D.C. signal to supply to the input of said counter a series of sequentially occurring pulses of equal time separation during a first predetermined time interval and a second time interval following said first time interval, with the second time interval being proportional to the magnitude of said D.C. signal applied to said converter, first circuit means for resetting said counter to a predetermined starting count at the beginning of said first time interval, and second circuit means operatively connected to said counter and being responsive to said counter being driven to a predetermined intermediate scale count during said first time interval for resetting said counter to said starting count at the end of said first time interval, said predetermined intermediate scale count being less than the maximum count to which said counter can be driven by the converter produced pulses during said second time interval, and said second circuit means including means for preventing said counter from being reset to said starting count during said second time interval under conditions where the counter is driven to a count equal or exceeding said intermediate scale count.

2. The weighing apparatus defined in claim 1 wherein said signal utilization means comprises means providing a digital read-out of the output of said counter at the end of said second time interval.

3. The weighing apparatus defined in claim 1 comprising third circuit means operatively connected between the output of said counter and said signal utilization means, means in said converter for supplying a memory command signal to said third circuit means at the end of said second time interval, said third circuit means being responsive to said memory command signal to memorize the output of said counter and to supply the memorized counter output to said signal utilization means, and said signal utilization means being operative to provide a read-out of the memorized counter output supplied by said third circuit means.

4. In a weighing apparatus, a structure for receiving a load to be weighed, electrical signal producing means responsive to the weight of a load applied to said structure for producing an electrical analog signal having a magnitude that is a function of the weight of the load applied to said structure, a dual ramp analog-to-digital converter, means operatively connecting the input of said converter to said signal producing means to apply said analog signal to the input of said converter, said converter having an integrating circuit for integrating a sample of said analog signal during a first time interval, and said converter being responsive to a predetermined control signal to terminate the integration of said analog signal and to apply a reference signal of known magnitude to said integrating circuit for integrating said reference signal for a second time interval that is proportional to the magnitude of said analog signal, said converter further including a pulse generator for producing sequentially occurring pulses of equal time separation and gate means controlled by the integrated output of said integrating circuit to supply an output of the generator-produced pulses during both said first and second time intervals, with the number of pulses supplied during said second time interval being representative of the magnitude of said analog signal, a pulse counter driven by the pulses supplied by said gate means for producing at its output binary coded data information representing the number of counter pulses in each of said first and second time intervals, control circuit means operatively connected to said counter and to said converter and being responsive to the count-in of a predetermined number of pulses by the counter during said first time interval for supplying said control signal to said converter and further for feeding back said control signal to reset said counter to a predetermined starting count at the end of said first time interval, storage circuit means operatively connected to the output of said counter and being responsive to a predetermined memory command signal for memorizing the binary coded data information supplied at the output of said counter, means in said converter for supplying said command signal to said storage circuit means at the end of said second time interval, means providing a read-out of the binary coded data information that is memorized by said storage circuit means, and means forming a part of said control circuit means for preventing said counter from being reset by a re-occurrence of said control signal in said second time interval.

* * * * *

UNITED STATES PATENT OFFICE
CERTIFICATE OF CORRECTION

Patent No. 3,662,845                Dated  May 16, 1972

Inventor(s)  Chapin A. Pratt

It is certified that error appears in the above-identified patent and that said Letters Patent are hereby corrected as shown below:

Column 4, line 48, delete "is applied to in circuit 28,".

Column 4, line 49, delete "and the polarity of the signal voltage".

Column 5, line 48, change "The p53op-" to --The polarity of the reference signal from source 58 is op- --.

Column 6, line 21, change "place" to --pulse--.

Column 6, line 42, change "$\bar{Q}$" to --Q--.

Column 6, line 43, change "Q" to --$\bar{Q}$--.

Column 8, line 1, after "integrated" insert --,--.

Signed and sealed this 29th day of August 1972.

(SEAL)
Attest:

EDWARD M.FLETCHER,JR.                ROBERT GOTTSCHALK
Attesting Officer                    Commissioner of Patents